United States Patent [19]
Davenport

[11] Patent Number: 5,873,449
[45] Date of Patent: Feb. 23, 1999

[54] SHIFT TABLE FOR USE IN A PRODUCT CONVEYOR SYSTEM HAVING WORKSTATIONS

[75] Inventor: Timothy B. Davenport, North Richard Hills, Tex.

[73] Assignee: AST Research, Inc., Irvine, Calif.

[21] Appl. No.: 753,400

[22] Filed: Nov. 26, 1996

[51] Int. Cl.⁶ .................................................. B65G 37/00
[52] U.S. Cl. ................................ 198/370.09; 198/346.2; 198/586; 198/346.1
[58] Field of Search ........................... 198/370.09, 370.1, 198/586, 346.2, 346, 346.1, 950, 574

[56] References Cited

U.S. PATENT DOCUMENTS

| | | | |
|---|---|---|---|
| 3,342,016 | 9/1967 | Bambra et al. | 198/586 |
| 3,603,271 | 9/1971 | Remensperger | 198/574 |
| 3,929,219 | 12/1975 | Malcom | 198/574 |
| 4,055,245 | 10/1977 | Sundberg | 198/574 |
| 4,664,579 | 5/1987 | Schedwin | 198/346.1 |
| 4,729,467 | 3/1988 | Vanderlinde | 198/586 |
| 4,930,614 | 6/1990 | Kronseder | 198/346.2 |

*Primary Examiner*—William E. Terrell
*Assistant Examiner*—Khoi H. Tran
*Attorney, Agent, or Firm*—Knobbe, Martens, Olson & Bear, LLP

[57] ABSTRACT

A workstation includes a support assembly with at least one longitudinally extending rail. A longitudinally extending conveyor is slidably mounted to the rail for sliding movement between a home position, where the conveyor is predominately provided for working on a workpiece, and a second position, where one end of the conveyor is provided adjacent to a conveyor line. The conveyor has a longitudinal length that allows an access space between the conveyor and one of the lines when the conveyor is provided in the home position.

13 Claims, 10 Drawing Sheets

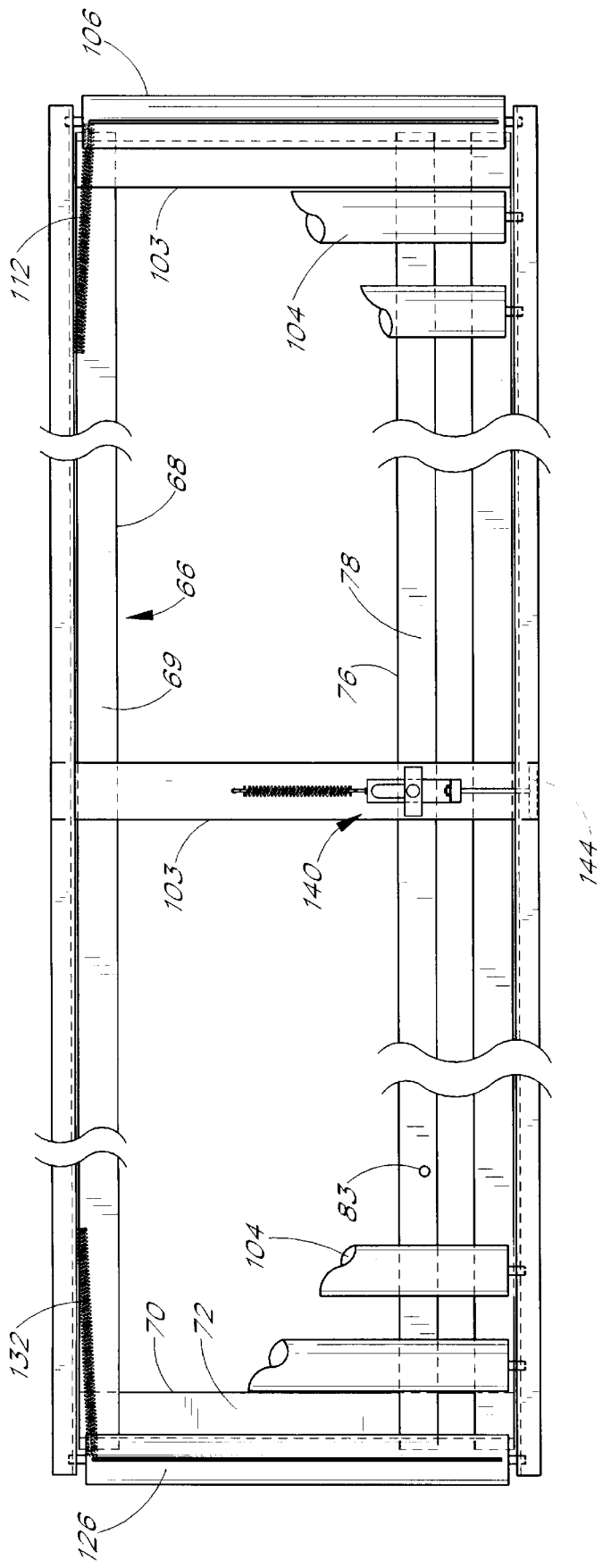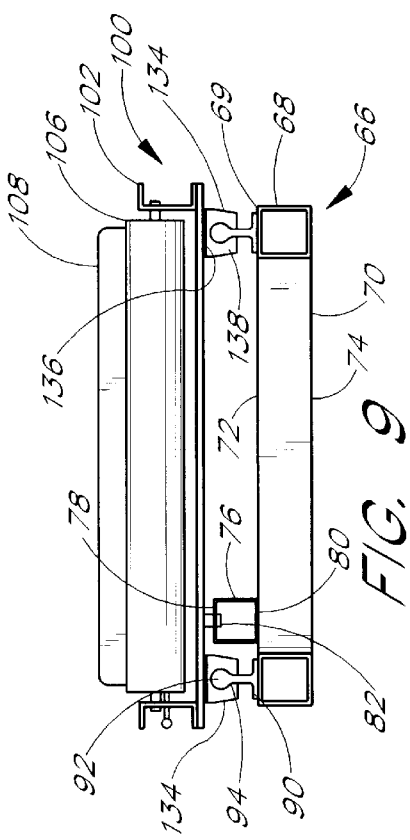

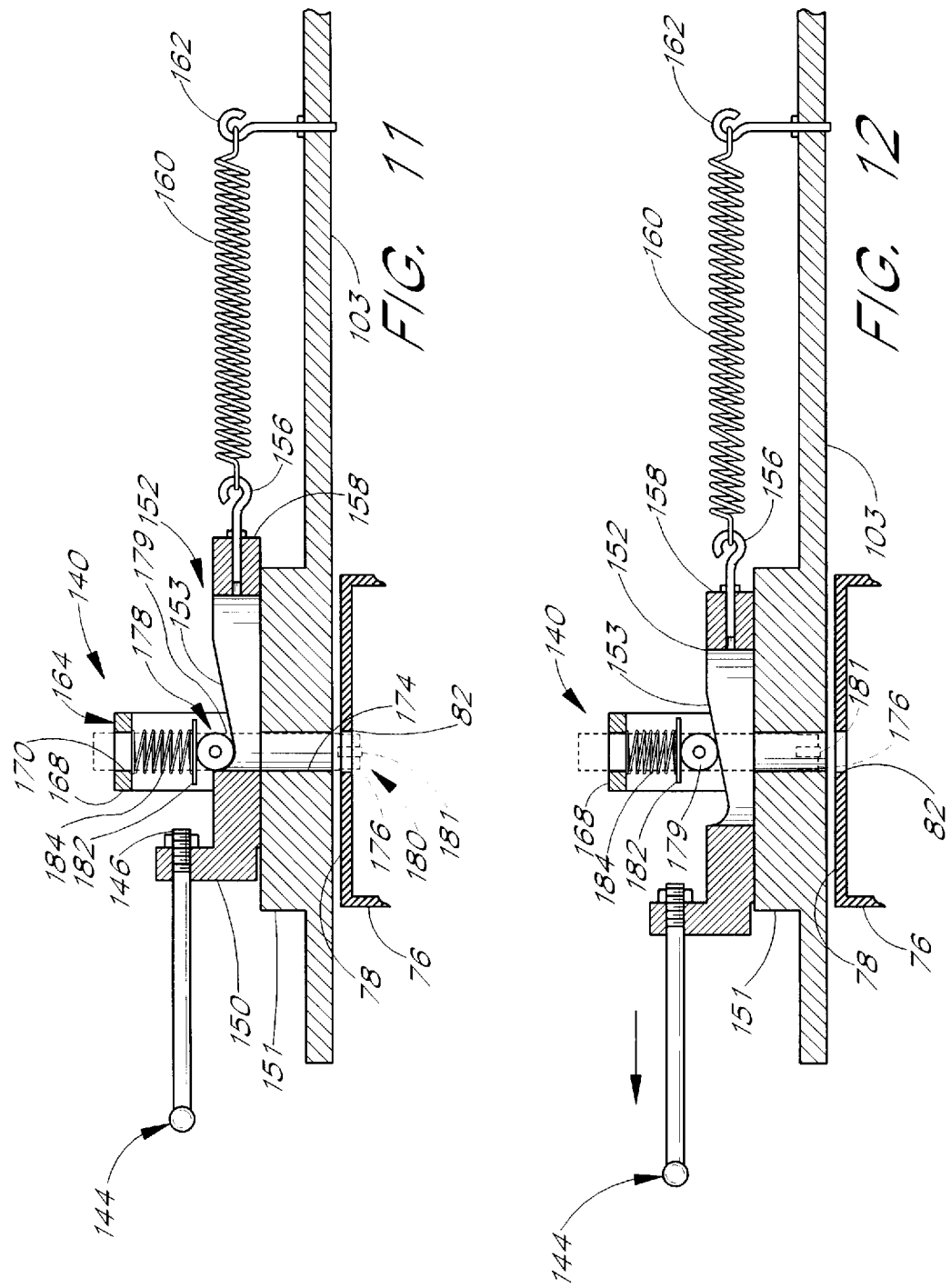

SHIFT TABLE FOR USE IN A PRODUCT CONVEYOR SYSTEM HAVING WORKSTATIONS

BACKGROUND OF THE INVENTION

1. Field of the Invention

The present invention relates to workstations having conveyor systems for delivering workpieces to and from the workstations.

2. Description of the Related Art

In a computer production facility, an area A of the facility is often dedicated to testing individual computer components. As illustrated in FIG. 1, the computer component testing area A often includes a supply conveyor line B, a delivery conveyor line C and a plurality of juxtaposed workstations D that are positioned between the conveyor lines B, C. Each of the workstations D is supplied with computer components for testing by the supply conveyor line B. After testing, the components are transferred to the delivery conveyor line C to be delivered for packaging or further testing. In the past, to prevent the workers from being confined within the individual work areas E formed by the conveyor lines B and the adjacent workstations D, each of the workstations D included a pivoting gravity gate F which operates in a manner similar to a drawbridge. The gravity gate F is lifted and pivoted by a worker to an open or vertical position, as illustrated in FIG. 2, to allow access into or out of each of the work areas E. When the gravity gate F is open, an access space G is provided between the workstation D and the conveyor line B through which the worker passes. After the worker passes through the access space G, the worker lowers the gravity gate F to a closed or horizontal position. The workstation D may include a spring arrangement to assist the workers in raising and lowering the gates F.

Although the gravity gates F allow access into and out of the work areas E, these gates F have multiple drawbacks. One drawback is that the gravity gates are potentially a safety hazard because they are not easily or quickly opened in the event of a fire or other emergency. Another drawback is that the gravity gates F can fall and injure the workers or damage the computer components. A further drawback is that each gravity gate F includes exposed mechanisms that can cause injury to a worker manipulating the gravity gate F. Another problem is that workers often forget to close the gravity gates. As a result, computer components sometimes fall to the floor and become damaged. A further drawback is that, even with a spring arrangement, raising and lowering the gravity gates requires strenuous effort for some workers.

SUMMARY OF THE INVENTION

The workstation of the present invention includes a shifting conveyor that eliminates the aforementioned problems with gravity gate workstations. The shifting conveyor allows workers to freely pass into and out of work areas without having to manipulate a gate. Allowing the workers to freely pass into and out of work areas without a gate is more convenient, saves worker time, and eliminates the possibility of being trapped within a work area during a fire or other emergency. Without a gate, the strenuous task of lifting and closing the gate, the potential problems caused by the gate accidentally falling on a worker or workpiece, and the problems caused by a worker forgetting to close the gate are eliminated.

The above advantages are provided by a workstation that includes a support assembly with at least one longitudinally extending rail. A longitudinally extending conveyor is slidably mounted to the rail for sliding movement between a home position, where the conveyor is predominantly provided for working on a workpiece, and a second position, where one end of the conveyor is provided adjacent to a conveyor line. The conveyor has a longitudinal length that allows an access space between the conveyor and one of the lines when the conveyor is in the home position.

One aspect of the present invention is a workstation for working on a workpiece. The workstation comprises a support assembly which includes at least one longitudinally extending rail. A longitudinally extending conveyor has opposite ends and is slidably mounted to the longitudinally extending rail for slidable movement between at least a home position where the conveyor is predominantly provided for working on the workpiece and a second position where one end of the conveyor is provided adjacent to a conveyor line. The conveyor has a longitudinal length that allows an access space between the conveyor and the conveyor line when the conveyor is provided in the home position. Preferably, the conveyor is slidably mounted to the rail by at least one slidable receiver provided along an undersurface of the conveyor. The receiver is slidably mounted to the rail for sliding and shifting movement of the conveyor in a longitudinal and horizontal direction. Also preferably, a pair of stop devices are provided near opposite ends of the conveyor to prevent the workpiece from accidentally falling off the conveyor. Each of the stop devices includes a roller with a laterally and vertically extending plate. In a preferred embodiment, the roller rotates in only one direction. A spring biases the stop plate to an upright position so as to prevent the workpiece from falling off the conveyor. Preferably, means for preventing a workpiece from falling off the conveyor is provided near at least one end of the conveyor. The preventing means is made ineffective when the conveyor is provided in at least the second position. Also preferably, the conveyor includes a locking mechanism. The locking mechanism cooperates with the supporting assembly to lock the conveyor in the home and second positions.

Another aspect of the present invention is a worktable positionable between first and second conveyor lines. Products are conveyed between the worktable and the first conveyor line and products are conveyed between the worktable and the second conveyor line. The worktable comprises a top surface having a conveyor which permits products to be moved across the top surface. A moveable support for the top surface permits lateral movement of the top surface from a first position where the top surface is proximate to the first conveyor line to a second position where the top surface is proximate to the second conveyor line. Preferably, sufficient space is provided between the worktable and the first conveyor line when the top surface is in the second position to permit a person to walk unimpeded between the worktable and the first conveyor line.

BRIEF DESCRIPTION OF THE DRAWINGS

The present invention will be described below in connection with the accompanying drawing figures, in which:

FIG. 8 illustrates a top plan view of the conveyor with most of the rollers removed so that the locking mechanism and other parts of the workstation may be shown;

FIG. 9 illustrates an end view of the conveyor and a portion of the workstation;

FIG. 11 illustrates a cross-sectional view of the locking mechanism, taken along line 11—11 of FIG. 10, and shows the locking mechanism engaged with a stop hole of a longitudinally extending beam;

FIG. 12 illustrates a cross-sectional view of the locking mechanism, similar to FIG. 11, and shows the locking mechanism disengaged from the stop hole of the longitudinally extending beam.

DETAILED DESCRIPTION OF THE PREFERRED EMBODIMENTS

Figure 1:
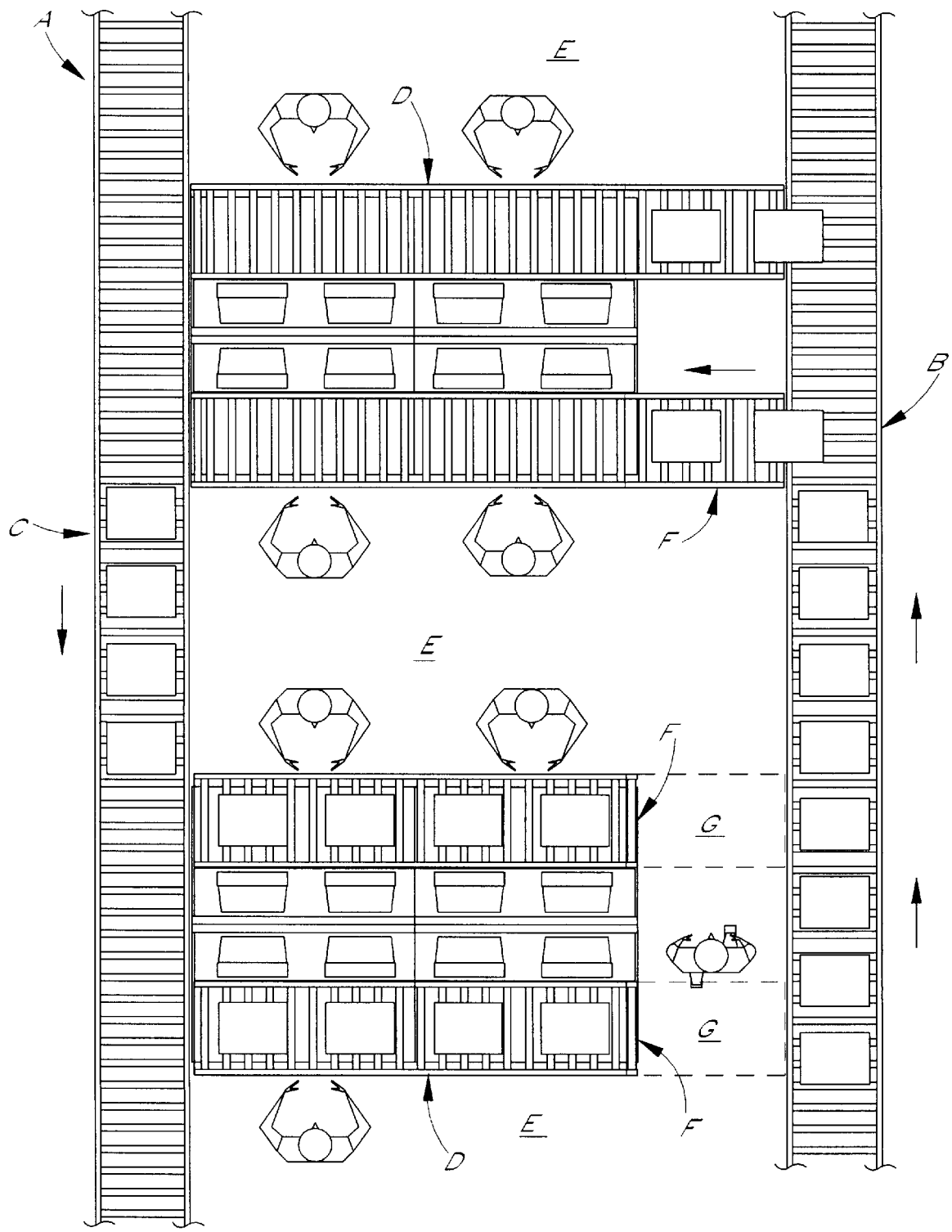
FIG. 1 illustrates a top plan view of a computer component testing area of the prior art and shows a number of the rotatable gravity gates of the workstations in an open position and the remainder of the gravity gates in a closed position.
Figure 2:
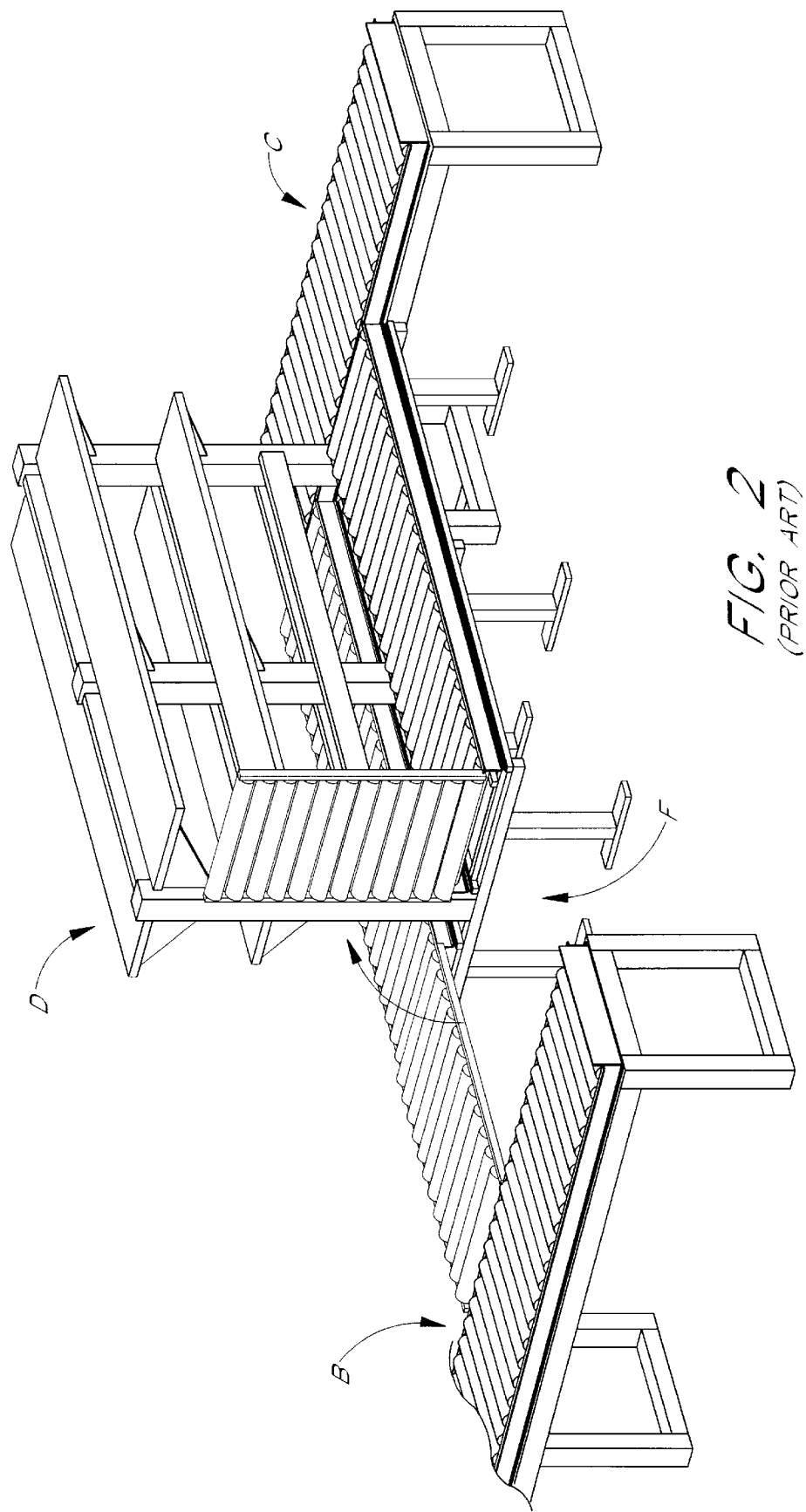
FIG. 2 illustrates a perspective view of one of the prior art workstations of FIG. 1 provided between a supply conveyor line and delivery conveyor line and shows one gravity gate pivoted to an open position and one in a closed position.
Figure 3:
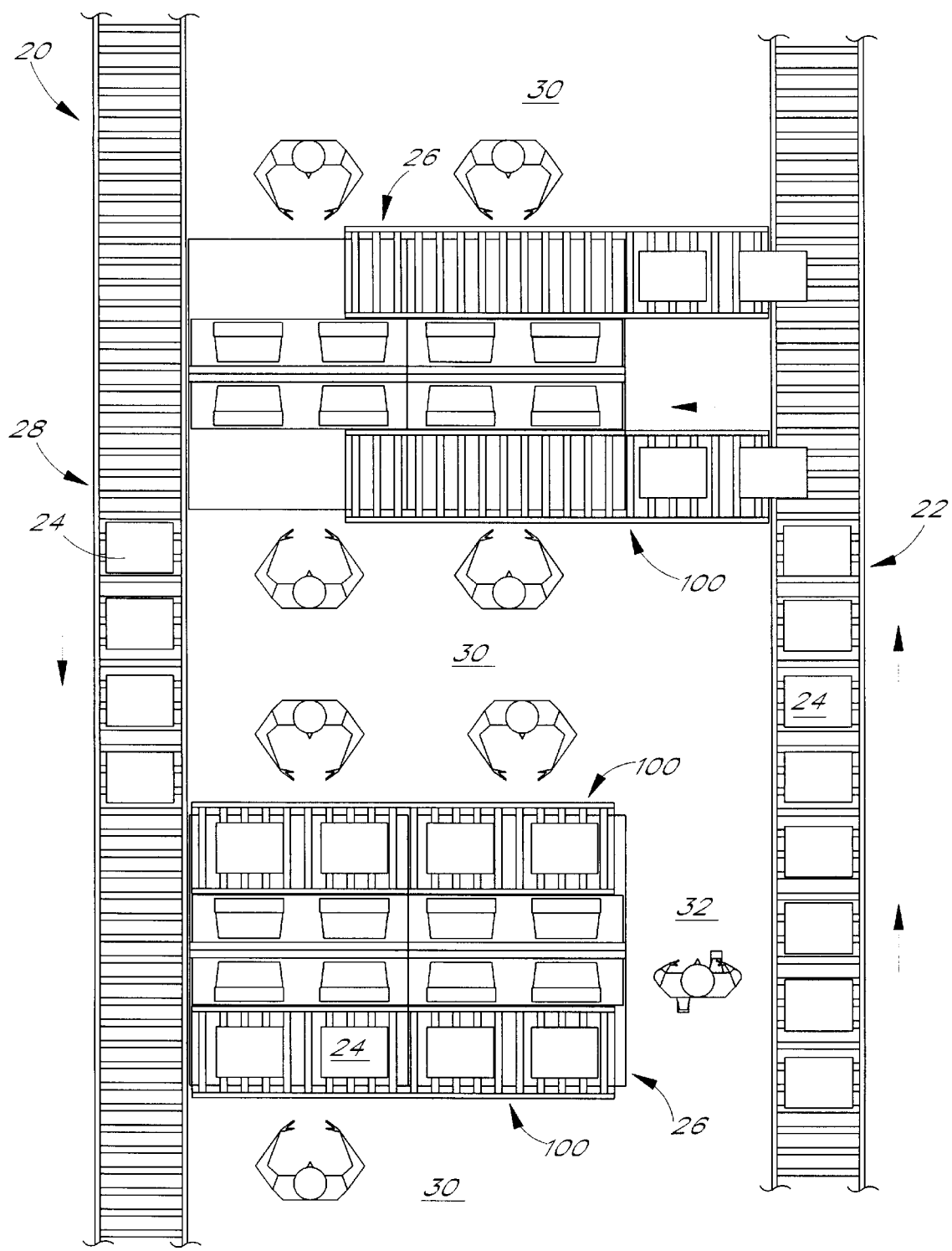
FIG. 3 illustrates a top plan view of a computer component testing area, similar to FIG. 1, and shows the workstations of the present invention and the access space provided thereby between the workstations and one of the conveyor lines.
Figure 4:
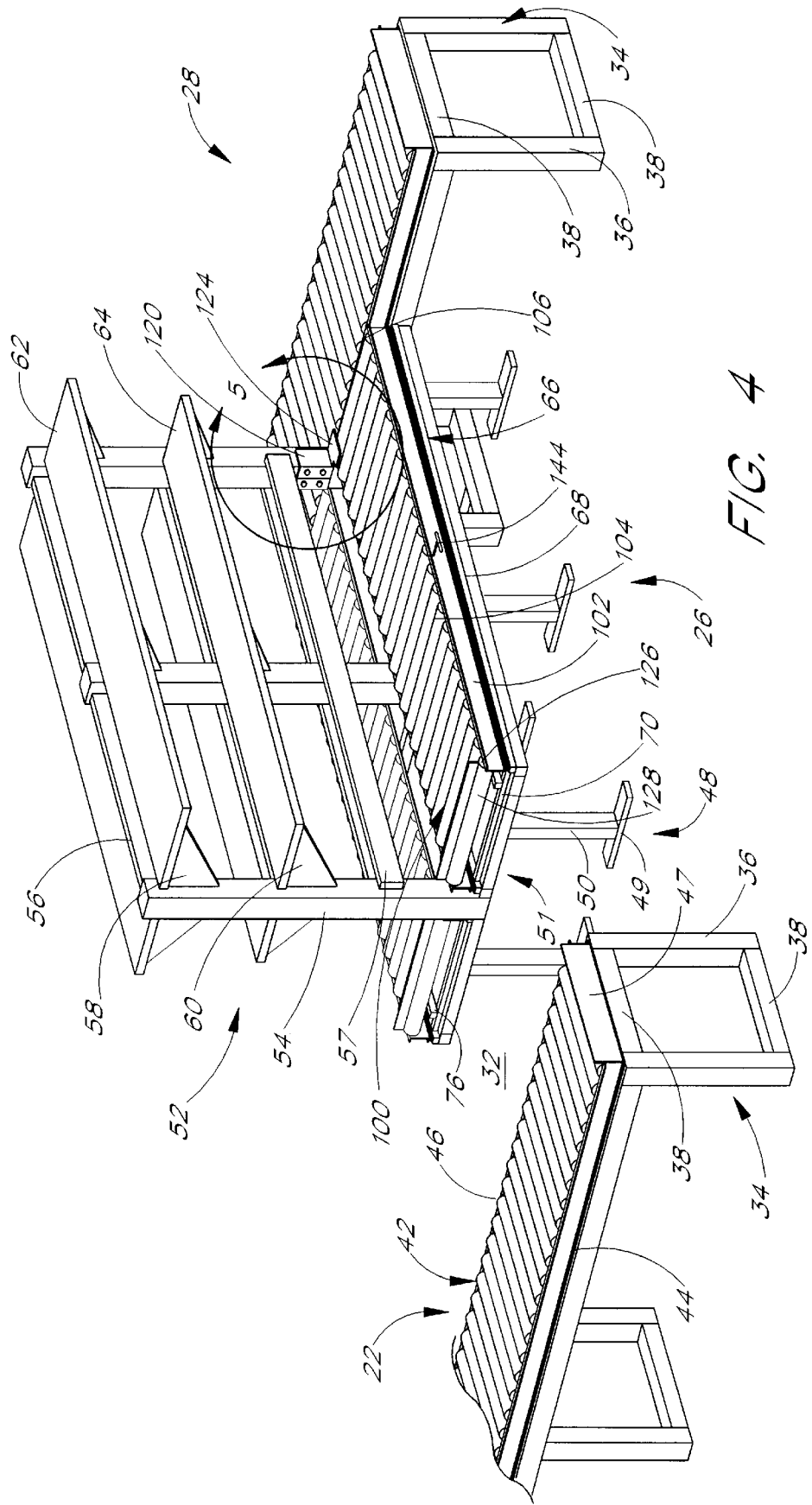
FIG. 4 illustrates a perspective view of one of the workstations of FIG. 3 provided between a supply conveyor line and delivery conveyor line and shows the conveyor of the workstation in a home position.

FIGS. 3 and 4 illustrate a computer component testing area, indicated generally by the reference numeral 20. The testing area 20 includes a supply conveyor line 22 for supplying computer components 24 to a plurality of workstations, each indicated generally by the reference numeral 26. Each of the workstations 26 is oriented perpendicular to the supply conveyor line 22. The computer components 24 are tested at the workstations 26, and, thereafter, are transferred to a delivery conveyor line 28, which is generally parallel to the supply conveyor line 22. The delivery conveyor line 28 delivers the computer components 24 for packaging or additional testing.

Although the preferred embodiment of the invention is described in connection with testing computer components 24, it will be readily understood by those skilled in the art that the present invention can be applied to workpieces other than computer components and for purposes other than testing, such as, for example, assembling products.

The conveyor lines 22, 28 and the juxtaposed workstations 26 define multiple work areas 30 in which a number of workers may work. In order to provide relatively free access into and out of the work areas 30, an access space 32 is provided between the workstations 26 and at least one of the conveyor lines 22, 28 in a manner that will be described in more detail below.

As shown in FIG. 4, each conveyor line 22, 28 includes a support assembly 34. The support assembly 34 includes multiple pairs of vertical supports 36. Each pair of vertical supports 36 may also include transverse supports 38.

A conveyor system 42 is supported by the support assembly 34. The conveyor 42 includes a pair of parallel rails 44 with a plurality of transverse rollers 46 pivotally mounted for rotation therebetween. Preferably, the rollers 46 are driven by a motor and belt assembly (not shown). A stop plate 47 is provided at the ends of the conveyor system 42 for preventing computer components from falling off the conveyor lines 22, 28.

FIGS. 4–12 illustrate the workstation 26 in greater detail. The workstation 26 is preferably located adjacent to the delivery conveyor line 28. However, it will be readily understood by those skilled in the art that the workstation 26 can be provided in a variety of locations between the conveyor lines 22, 28 including, without limitation, adjacent to the supply conveyor line 22 or centered between the conveyor lines 22, 28. The workstation 26 includes a support assembly 48. The support assembly 48 comprises multiple laterally extending bases 49. A leg 50 extends vertically from each of the bases 49 and supports a support frame 51.

A shelf assembly 52 extends vertically from the frame 51. The shelf assembly 52 includes multiple vertical main support members 54. The main support members 54 are connected by upper and lower longitudinally extending members 56, 57. The lower longitudinally extending member 57 includes a plurality of power outlets (not shown). Upper and lower sets of braces 58, 60 are connected to the main support members 54 for supporting an upper and a lower shelf 62, 64, respectively. The shelves 62, 64 supports a variety of testing equipment (not shown) used for testing the computer components 24. The testing equipment and computer components 24 are powered by the power outlets in the lower longitudinally extending member 57.

As illustrated in FIGS. 4–9, a conveyor support frame 66 is also supported by the support assembly 48. The conveyor support frame 66 includes a pair of longitudinally extending beams 68. Each of the longitudinally extending beams 68 includes an upper surface 69 (FIG. 9). The frame 66 includes a pair of laterally extending beams 70 that extend between the longitudinally extending beams 68 near opposite ends of the beams 68. As illustrated in FIG. 9, the laterally extending beams 70 include upper and lower surfaces 72, 74, respectively. A third longitudinally extending beam 76 is supported by the upper surfaces 72 of the laterally extending beams 70 (see FIGS. 8 and 9). The longitudinally extending beam 76 includes upper and lower surfaces 78, 80. A first stop hole 82 (FIG. 9, 13) and a second stop hole 83 (FIG. 8) are provided in the upper surface 78 of the longitudinally extending beam 76.

A pair of longitudinally extending slide rails 88 are connected to the upper surface 69 of the longitudinally extending beams 68. Each slide rail 88 has a longitudinally extending base portion 90 and a longitudinally extending rod-shaped top portion 92.

A conveyor, indicated generally by the reference numeral 100, is slidably supported by the slide rails 88. The conveyor 100 includes a pair of parallel side rails 102. A plurality of laterally extending cross plates 103 are connected to the undersurface of the side rails 102. A plurality of laterally extending rollers 104 extend between, and are rotatably mounted to, the side rails 102.

Figure 5A:
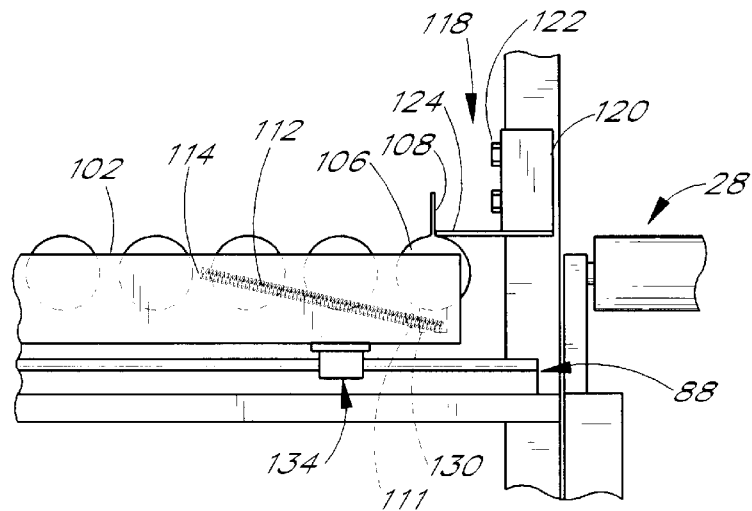
FIG. 5a illustrates a partial sectional view of one end of the workstation and a portion of the delivery conveyor line taken along section 5 of FIG. 4 and shows the conveyor just prior to entering the home position.

As illustrated in FIG. 5a, an end roller 106 is provided at the end of the rollers 104 closest to the delivery conveyor line 28. The end roller 106 includes a laterally extending contact plate 108 that is welded to a top part of the roller 106. The end roller 106 also includes a connecting lug 110 that is welded to a bottom part of the roller 106 at one end of the roller 106. A cylindrical stop member 111 protrudes from an inner side of the side rail 102. A retention spring 112 is provided between the connecting lug 110 and a connecting point 114 on the rail 102.

A contact mechanism 118 is mounted to one of the aforementioned main support members 54 adjacent to the delivery conveyor line 28. The contact mechanism 118 includes a bracket 120 mounted to the main support member 54 by a pair of threaded fasteners 122. A contact flange 124 extends horizontally from the bracket 120 over one corner of the conveyor support frame 66.

Figure 7A:
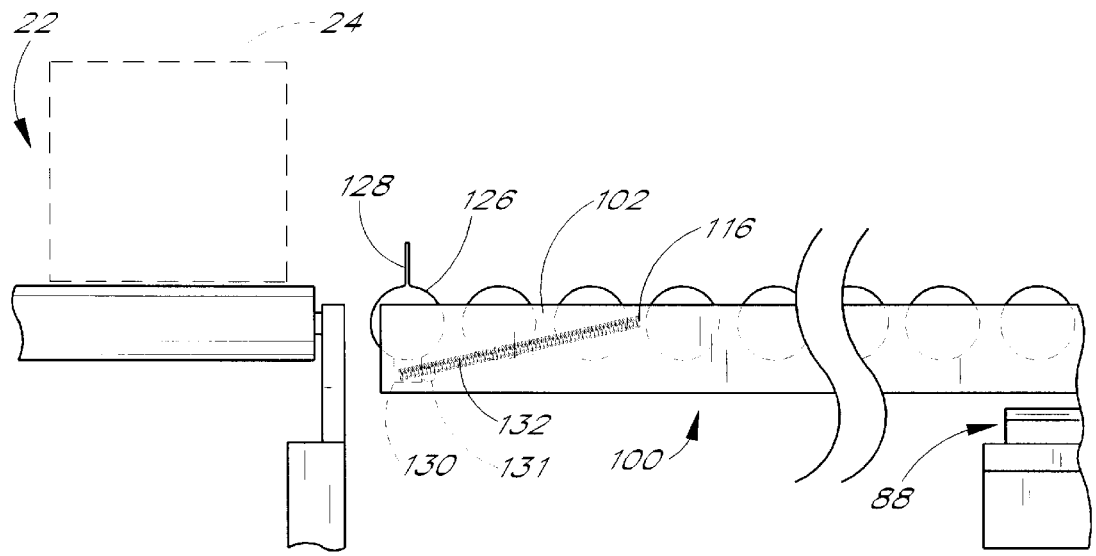
FIG. 7a illustrates a partial sectional view of one end of the workstation and a portion of the supply conveyor line, taken along section 7 of FIG. 6, and shows the conveyor in a loading position, and shows a workpiece on the supply conveyor line.

As illustrated in FIG. 7a, a second end roller 126 is provided at the end of the rollers 104 near an end of the conveyor 100 closest to the supply conveyor line 22. A laterally extending contact plate 128 is welded to a top part of the roller 126. A connecting lug 130 is welded to a bottom part of the roller 126 near one end of the roller 126. A cylindrical stop member 131 protrudes from an inner side of the side rail 102. A retention spring 132 is provided between the connecting lug 130 and a connecting point 116 on the side rail 102.

As illustrated in FIGS. 5a and 9, slidable receivers 134 are attached to the undersurface of the cross plates 103. The receivers 134 are known in the art as pillow block linear bearings. The receivers 134 slidably receive the slide rails 88 so as to allow shifting and sliding movement of the conveyor 100. The receivers 134 engage the slide rails 88 so that the conveyor 100 is prevented from disengaging the rails 88. Each receiver 134 includes a mounting portion 136 mounted to the undersurface of each of the cross plates 103 and a receiving portion 138 that slidably receives the rod-shaped top portion of each of the slide rails 88.

As illustrated in FIGS. 8–12, a locking assembly, indicated generally by the reference numeral 140, is provided on an upper surface of one of the cross plates 103. The locking assembly 140 has a T-shaped handle 144 with a threaded end 146. A bolt 148 cooperates with the threaded end 146 of the handle 144 for attaching the handle 144 to a first connecting portion 150 of a ramp member 152. The ramp member 152 is slidably supported by a flat raised portion 151 of the cross plate 103. The ramp member 152 has a sloping upper surface 153. A horizontally extending eyebolt 156 is mounted to a second connecting portion 158 of the ramp member 152. A retention spring 160 connects the eyebolt 156 to a second vertically extending eyebolt 162, which is mounted to the cross plate 103.

Figure 13:
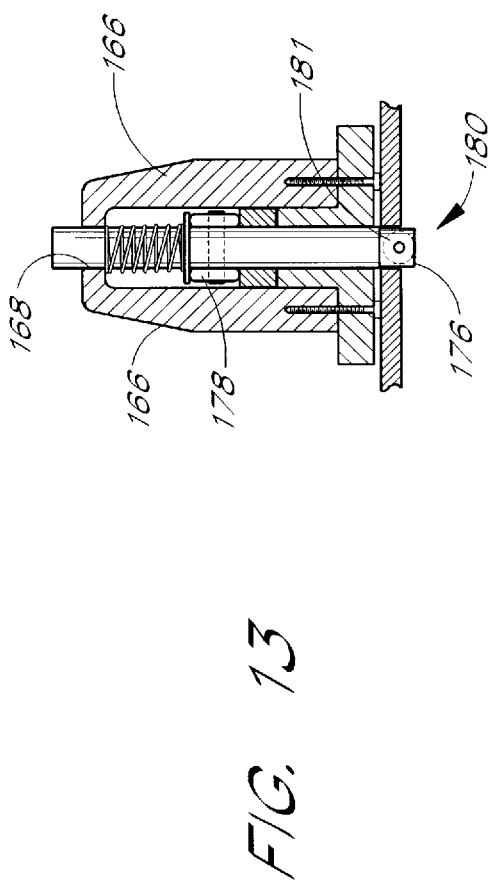
FIG. 13 illustrates a cross-sectional view of the locking pin and U-shaped bracket of the locking mechanism taken along line 13—13 of FIG. 10.

A U-shaped bracket 164 includes a pair of vertical legs 165 (FIG. 13) that straddle the raised portion 151 and ramp member 152. The vertical legs are connected by an upper bridge portion 168. The U-shaped bracket 164 is mounted to an upper surface of the cross plate 103. The upper bridge portion 168 includes a receiving hole 170. The raised portion 151 and the cross plate 103 also include aligned receiving holes 174 that, along with receiving hole 170, receive a locking pin 176. A first wheel assembly 178 includes a pair of wheels 179 rotatably mounted to the pin 176 along opposite sides of the pin 176. The wheels 179 are preferably half inch bearings. A second wheel assembly 180 includes a wheel 181 rotatably mounted within the bottom of the pin 176 for rotation in a direction that is perpendicular to the rotational direction of the other wheels 178. The wheel 181 is preferably a three-eighths inch bearing. A plate 182 is supported by the first wheel assembly 178. The plate 182 also includes a receiving hole for receiving the lock pin 176. A compression spring 184, which also receives the pin 176, is provided between the upper surface of the plate 182 and the undersurface of the upper bridge portion 168.

The operation of the locking assembly 140 of the present invention will now be described. FIG. 11 illustrates the locking assembly 140 in a locked position. In the locked position, the locking pin 176 engages one of the aforementioned pin holes 82, 83 of the longitudinally extending beam 76 and the ramp member 152 is provided in a home position. To unlock the locking assembly 140, the locking pin 176 must be removed or disengaged from whichever hole 82, 83 of the beam 76 the pin 176 is disposed within. This is accomplished by pulling on the T-shaped handle 144 in a laterally outward direction so that the ramp member 152 moves laterally outward. Movement of the ramp member 152 in this manner causes the wheels 178 to roll up the slope surface 153 of the ramp member 152. This causes the locking pin 176 to move upwardly and disengage the pin hole 82, 83.

To lock the locking assembly 140, the locking pin 176 must first be disposed over one of the pin holes 82, 83 so that it may engage the pin hole 82, 83. To accomplish this, the T-shaped handle is released so that the retention spring 160 can restore the ramp member 152 to its home position. Once the ramp member 152 is in its home position, the restoring force in the compression spring 184 forces the pin 176 downwardly into the hole 82, 83, or, in the event the pin 176 is not disposed over one of the pin holes 82, 83, against the upper surface 78 of the longitudinally extending beam 76. If the pin 176 is not disposed over one of the pin holes 82, 83, the compression spring 184 causes the lower wheel 181 on the bottom of the pin 176 to be forced against the upper surface 78 of the beam 76. As the conveyor 100 is shifted, the lower wheel 181 rolls along the upper surface 78 of the beam 76. When the conveyor 100 is shifted to a position where the locking pin 176 is disposed over one of the holes 82, 83 of the beam 76, the compression spring 184 forces the pin 176 into the hole 82, 83 so as to lock the locking assembly 140.

The operation of the workstation 26 of the present invention will now be described in connection with FIGS. 4–7. In FIG. 4, the conveyor 100 of the workstation 26 is illustrated in a home position. The conveyor 100 is predominantly provided in the home position because this position is ideal for testing the components 24 with the aforementioned testing equipment.

Figure 6:
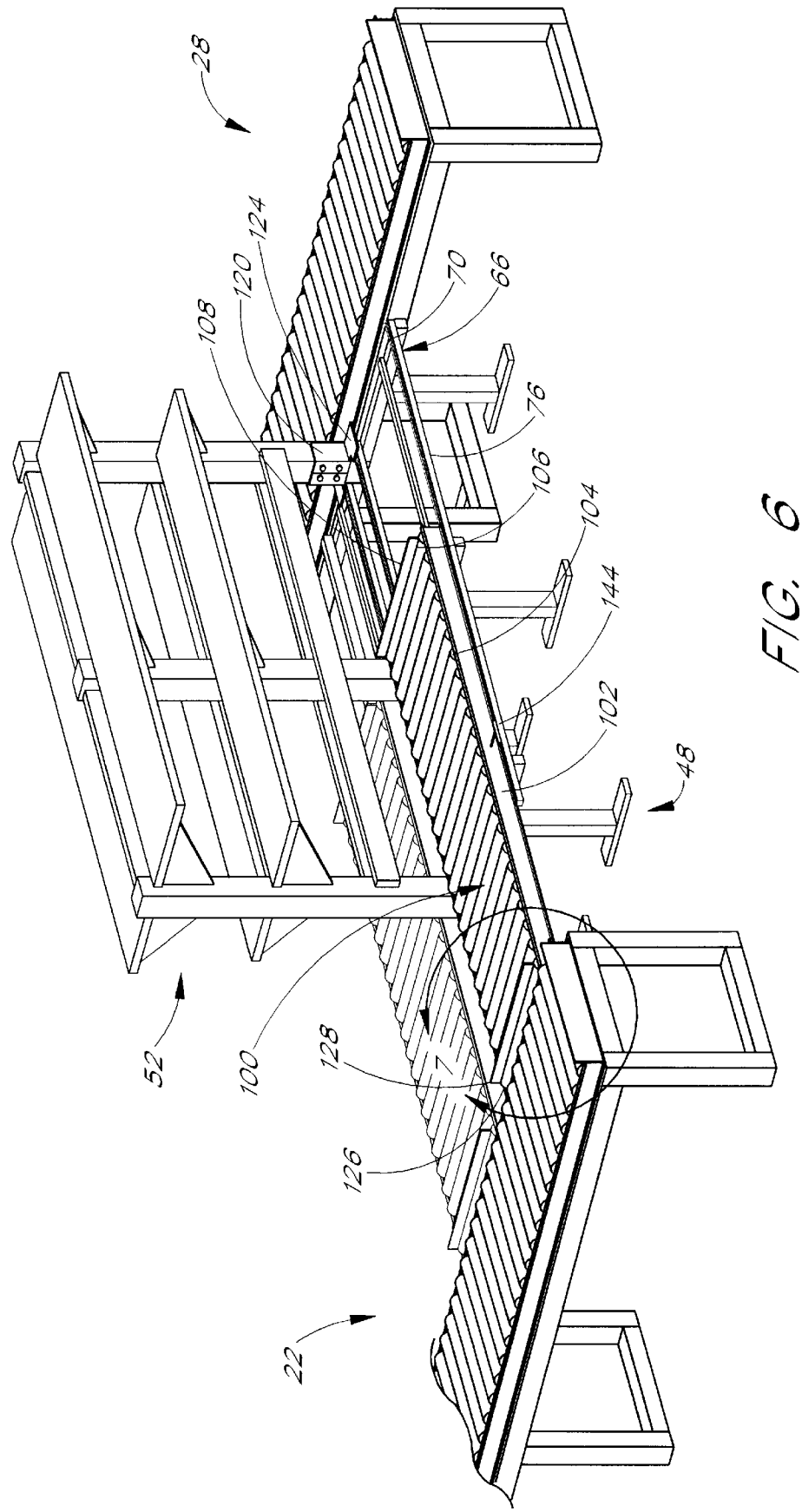
FIG. 6 illustrates a perspective view of the workstation provided between the supply conveyor line and the delivery conveyor line, similar to FIG. 4, and shows the conveyor shifted to a second or loading position adjacent to the supply conveyor line.

In order to load the conveyor 100 with a plurality of computer components 24 for testing, the conveyor 100 is shifted to a loading position (FIG. 6). This is accomplished by first pulling outwardly on the T-shaped handle 144 so as to disengage the locking pin 176 from the first stop hole 82 of the longitudinally extending beam 76 as described above. The conveyor 100 is then shifted to the loading position. In the loading position, the locking pin 176 is disposed over the second stop hole 83 (FIG. 8). Before or when the conveyor 100 is shifted to the loading position, the operator allows the handle 144 to be restored to its laterally inward position so that the locking pin 176 can engage the second pin hole 83 of the beam 76. This causes the conveyor 100 to be locked in the loading position so that the conveyor will not slide when computer components are loaded onto the conveyor 100.

Figure 7B:
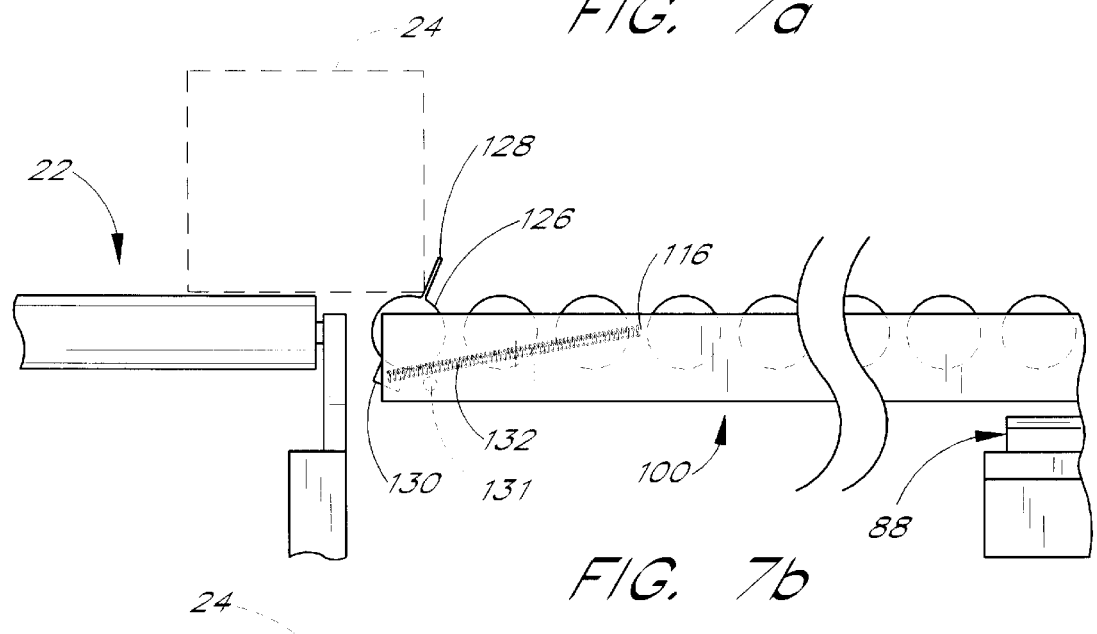
FIG. 7b illustrates a partial sectional view of one end of the workstation and a portion of the supply conveyor line, similar to FIG. 7a, and shows an end roller in a partially rotated position after being contacted by the workpiece as it is loaded onto the conveyor.
Figure 7C:
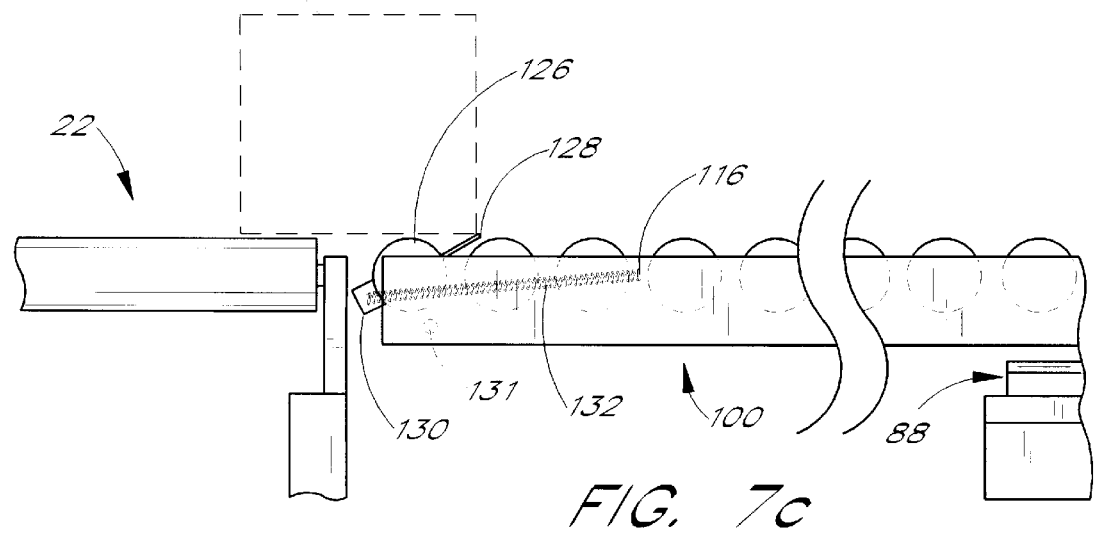
FIG. 7c illustrates a partial sectional view of one end of the workstation and part of one of the conveyor lines, similar to FIG. 7a, and shows the end roller in a fully rotated position after being contacted by the workpiece as it is loaded onto the conveyor.
Figure 10:
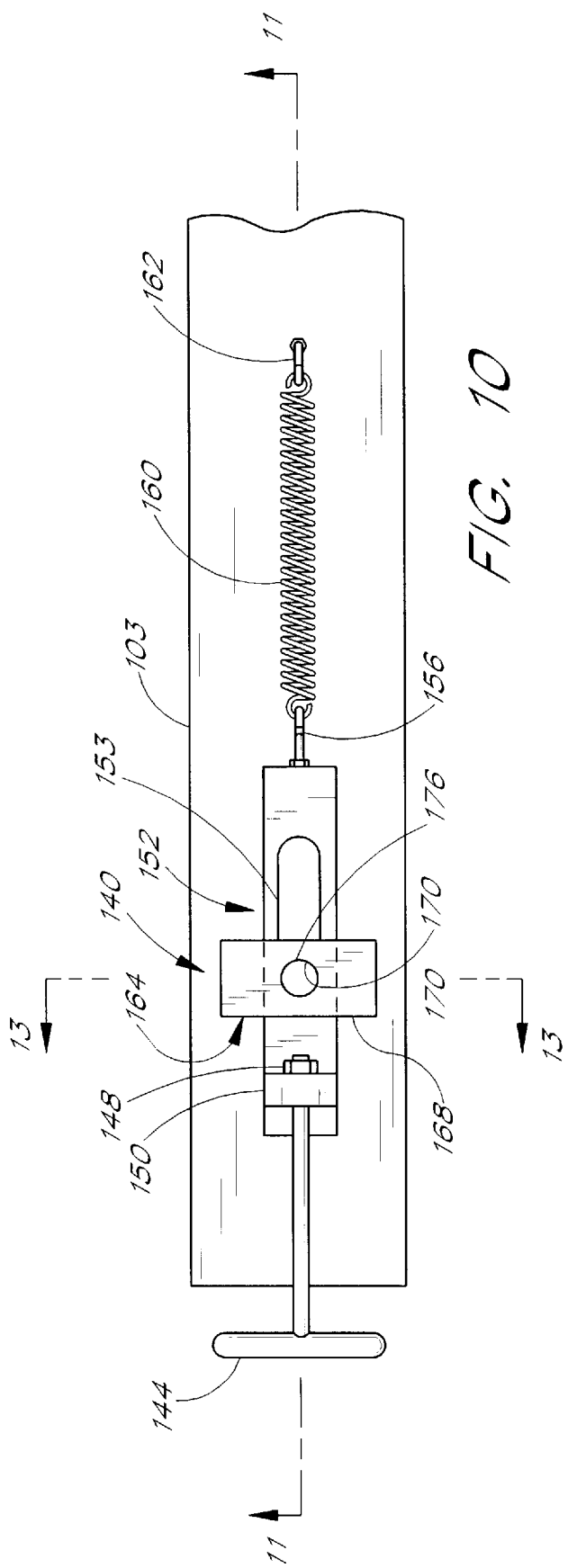
FIG. 10 illustrates an enlarged top view of the locking mechanism.

As illustrated in FIGS. 7a–c, as each computer component 24 is individually loaded onto the conveyor 100, the computer component 24 contacts the contact plate 128 of the end roller 126. This causes the end roller 126 to rotate from its original position (FIG. 7a) to a fully rotated position (FIG. 7c). As the end roller 126 rotates to a fully rotated position, the retention spring 132 stretches. In return, the spring 132 pulls on the connecting lug 130. When the computer component 24 is moved beyond the contact plate 128 of the end roller 126, the spring 132 restores the end roller 126 to its original position (FIG. 7a). The end roller 126 is prevented from rotating in the opposite direction by the stop member 131. As a result, the contact plate 128 prevents computer components 24 from falling off the conveyor 100 and becoming damaged. After all of the computer components 24 are loaded onto the conveyor 100, the locking assembly 140 is disengaged and the conveyor is shifted back towards the home position (FIG. 4) so that the components 24 may be tested.

Figure 5B:
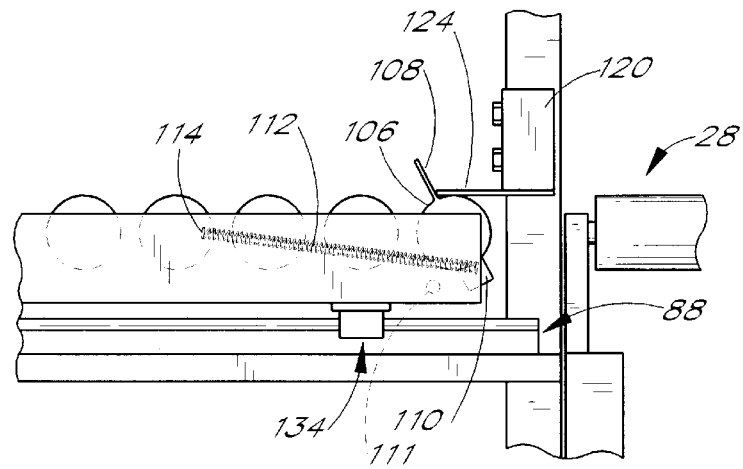
FIG. 5b illustrates a partial sectional view of one end of the workstation and a portion of the delivery conveyor line, similar to FIG. 5a, and shows an end roller in a slightly rotated position after being contacted by a projecting flange as the conveyor enters the home position.
Figure 5C:
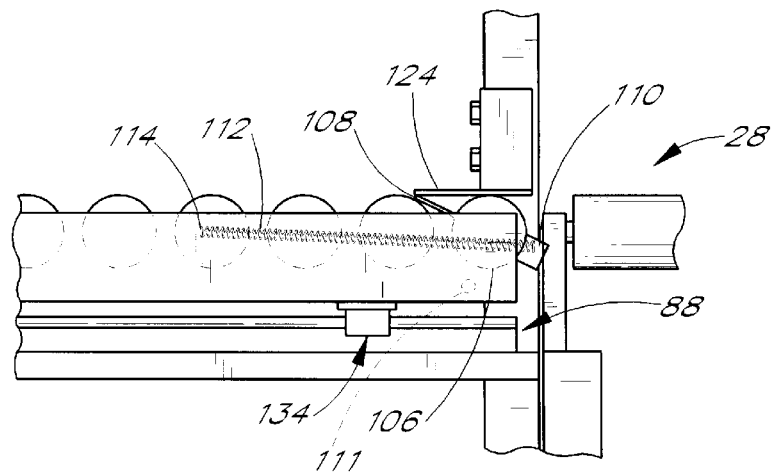
FIG. 5c illustrates a partial sectional view of one end of the workstation and a portion of the delivery conveyor line, similar to FIG. 5a, and shows the end roller in a fully rotated position after being contacted by the projecting flange when the conveyor is fully in the home position.

As illustrated in FIGS. 5a–c, as the conveyor 100 approaches the home position, the contact flange 124 of the contact mechanism 118 abuts the contact plate 108 of the end roller 106. This causes the end roller 106 to rotate from its original position (FIG. 5a) to a fully rotated position (FIG. 5c). When the end roller 106 is in the fully rotated position, the contact plate 108 does not inhibit transferring the computer components 24 from the conveyor 100 to the delivery conveyor line 28. When the end roller 106 is rotated, the retention spring 114 is stretched. Thus, when the conveyor 100 is shifted to a position where the contact flange 124 does not abut the contact plate 103, the spring 114 restores the end roller 106 to its original position. The end roller 106 is prevented from rotating in the opposite direction by the stop member 111. As a result, the computer components 24 are prevented from falling off the conveyor 100 and becoming damaged when the conveyor 100 is not in the home position.

Once the conveyor 100 is completely shifted to the home position, the operator engages the locking pin 176 with the first stop hole 82 of the longitudinally extending beam 76 to lock the conveyor 100 in the home position. This prevents the conveyor 100 from accidentally shifting. The computer components 24 are tested and transferred to the delivery conveyor line 28 to be delivered for packaging or further testing.

The shifting conveyor 100 of the workstation 26 of the present invention provides continued access space 32 between each workstation 26 and at least one of the conveyor lines 22, 28 except when conveyor 100 is periodically shifted to a loading position for a short period of time in order to load the components 24 onto the conveyor 100 for testing. Although the access space 32 is preferably located between the supply conveyor line 22 and the workstation 26, it will be readily understood by those skilled in the art that the access space 32 may be provided in a variety of locations without departing from the spirit or scope of the invention such as, but not limited to, between the delivery conveyor line 28 and the workstation 28 and between the workstation 26 and both conveyor lines 22, 28. This generally continued access space 32 was not provided in gravity gate equipped workstations in the past. The access space 32 allows the workers to freely pass into and out of the work areas 30. Not only is this convenient for the workers, but it saves the workers time and helps prevent the workers from being trapped within one of the work areas 30 during an emergency. The shifting conveyor 100 also eliminates the previously discussed problems with gravity gates such as the potential injury they can cause to workers and the potential damage they can cause to components.

It should be readily apparent from the foregoing description of the preferred embodiment of the invention that the shifting conveyor of the workstation of the present invention eliminates the problems with gravity gate workstations. Of course, the foregoing description is that of a preferred embodiment of the invention, and various changes and modifications may be made without departing from the spirit and scope of the invention as defined by the appended claims.

What is claimed is:

1. A workstation for working on a workpiece between a first conveyor line and a second conveyor line, the workstation comprising:

a support assembly including at least one longitudinally extending rail, said rail having a length between a first end and a second end which is less than a distance between said first conveyor line and said second conveyor line such that a space is provided between said first end of said rail and said first conveyor line whereby a worker can walk therethrough;

a longitudinally extending conveyor, said conveyor having respective first and second ends, said conveyor slidably mounted to said longitudinally extending rail for slidable longitudinal movement between at least a home position wherein said second end of said conveyor is proximate said second end of said rail where said conveyor is provided for working on said workpiece and a second position where said first end of said conveyor is positioned adjacent to said first conveyor line, said conveyor having a longitudinal length sized and configured to form an access space which provides an unobstructed pathway from a first side of said conveyor to a second side of said conveyor between said first end of said conveyor and said first conveyor line when said conveyor is positioned in said home position.

2. The workstation of claim 1, wherein said conveyor is slidably mounted to said rail by at least one slidable receiver positioned along an undersurface of said conveyor, said receiver slidably mounted to said rail for shifting movement of said conveyor in a longitudinal direction.

3. The workstation of claim 1, wherein a pair of stop devices are provided near opposite ends of said conveyor which prevent the workpiece from accidentally falling off said conveyor.

4. A workstation for working on a workpiece between a first conveyor line and a second conveyor line, the workstation comprising:

a support assembly including at least one longitudinally extending rail, said rail having a length between a first end and a second end which is less than a distance between said first conveyor line and said second conveyor line such that a space is provided between said first end of said rail and said first conveyor line;

a longitudinally extending conveyor, said conveyor having opposite ends, said conveyor slidably mounted to said longitudinally extending rail for slidable movement between at least a home position where said conveyor is predominantly provided for working on said workpiece and a second position where one end of said conveyor is provided adjacent to a conveyor line, said conveyor having a longitudinal length that allows an access space between said conveyor and said conveyor line when said conveyor is provided in said home position, wherein said conveyor is slidably mounted to said rail by at least one slidable receiver provided along an undersurface of said conveyor, said receiver slidably mounted to said rail for sliding movement of said conveyor in a longitudinal direction, and wherein a pair of stop devices are provided near opposite ends of said conveyor which prevent the workpiece from accidentally falling off said conveyor, wherein each of said stop devices includes a roller with a laterally and vertically extending plate.

5. The workstation of claim 4, wherein said roller of at least one of said stop devices rotates in a first rotational direction from a first orientation in which said laterally and vertically extending plate is vertical to a second orientation in which a workpiece can pass over said plate in a first longitudinal direction, said roller rotating in an opposite rotational direction to return said laterally and vertically extending plate to said first orientation to block movement of said workpiece in a second longitudinal direction opposite said first longitudinal direction.

6. The workstation of claim 5, further including a spring which biases said stop plate to an upright position so as to prevent the workpiece from falling off the conveyor.

7. The workstation of claim 1, wherein means for preventing a workpiece from falling off said conveyor are provided near at least one end of said conveyor.

8. The workstation of claim 7, wherein said preventing means are made ineffective when said conveyor is provided in at least said second position.

9. The workstation of claim 1, wherein said conveyor includes a locking mechanism, said locking mechanism cooperating with said supporting assembly for locking said conveyor in said home and second positions.

10. A worktable positionable between first and second conveyor lines, wherein products are conveyed between said worktable and said first conveyor line and products are conveyed between said worktable and said second conveyor line, said worktable comprising:

a top surface, said top surface comprising a conveyor which permits products to be moved across said top surface; and a moveable support for said top surface, said moveable support permitting lateral movement of said top surface from a first position where said top surface is proximate to said first conveyor line to a second position where said top surface is proximate to said second conveyor line, said moveable support forming an access space between said top surface and said final conveyor line when said top surface is in said second position, said access space providing an unobstructed pathway perpendicular to said conveyor to permit a worker to move from a first longitudinal side of said conveyor across to a second longitudinal side of said conveyor.

11. The worktable as defined in claim 10, wherein sufficient space is provided between said worktable and said first conveyor line when said top surface is in said second position to permit a person to walk unimpeded between said worktable and said first conveyor line.

12. A conveyance system comprising:

a support assembly;

a longitudinally extending conveyor, said conveyor having first and second ends and a longitudinal length between said first and second ends, said conveyor slidably mounted to said support assembly for slidable longitudinal movement between a first position and a second position, said first end of said conveyor being cantilevered from said support assembly and positioned proximate to a first conveyor line in said first position and said second end being spaced apart from a second conveyor line in said first position, said first end of said conveyor being spaced apart from said first conveyor line in said second position to form an access space between said first end and said first conveyor line, said access space providing an unobstructed pathway perpendicular to said conveyor to permit a worker to move from a first longitudinal side of said conveyor to an opposite longitudinal side of said conveyor across.

13. The workstation of claim 12, wherein said access space is sized and configured to permit a person to walk unimpeded through said access space.

* * * * *

UNITED STATES PATENT AND TRADEMARK OFFICE
CERTIFICATE OF CORRECTION

PATENT NO. : 5,873,449

DATED : February 23, 1999

INVENTOR : Timothy B. Davenport

It is certified that error appears in the above-identified patent and that said Letters Patent is hereby corrected as shown below:

In column 10 at line 16, change "said final" to --said first--.

In column 10 at line 44, change "conveyor to" to --conveyor across to--.

In column 10 at line 45, change "conveyor across" to --conveyor--.

Signed and Sealed this

Twenty-ninth Day of May, 2001

*Attest:*

NICHOLAS P. GODICI

*Attesting Officer*     *Acting Director of the United States Patent and Trademark Office*